Feb. 23, 1943.  A. J. WEATHERHEAD, JR  2,312,224
BRAKE CYLINDER ASSEMBLY AND METHOD OF MAKING SAME
Original Filed May 1, 1935

Inventor
ALBERT J. WEATHERHEAD, JR.

By
Attorneys

Patented Feb. 23, 1943

2,312,224

UNITED STATES PATENT OFFICE 2,312,224

BRAKE CYLINDER ASSEMBLY AND METHOD OF MAKING SAME

Albert J. Weatherhead, Jr., Cleveland, Ohio, assignor to The Weatherhead Company, Cleveland, Ohio, a corporation of Ohio Application May 1, 1935, Serial No. 19,201
Renewed April 22, 1939

12 Claims. (Cl. 29—152.1)

This invention relates to hydraulic brake cylinder assemblies and methods of making same and more particularly to the assembly of the wheel cylinders and supporting and fluid conducting parts for conventional hydraulic vehicle brakes. In some respects the present invention is an improvement over the invention disclosed in my copending application Serial No. 1908, filed January 15, 1935, and issued February 8, 1938, as Patent No. 2,107,403.

It is an object of my invention to provide a light and strong cylinder assembly which may be manufactured largely from pressed metal parts requiring a minimum of machining operations. It is also an object of my invention to provide a method of making such cylinder assemblies. Another object of my invention is to provide a cylinder assembly which can be formed exclusively from pressed metal parts and parts made by automatic screw machine operations. Another object of my invention is to provide a means of making fluid connections with members having curved or irregular surfaces. Another object is to provide a method of producing such fluid connections.

In my copending application aforesaid, I disclosed and claimed a brake cylinder assembly comprising cylindrical members made up of drawn steel tubes in combination with a fluid conducting and supporting block having an arcuate surface adapted to conform to the exterior of the cylindrical member and secured thereto throughout substantially the entire area of contact preferably by copper brazing. My present invention contemplates the formation of the cylinders from a drawn tube or tubes and the production of the saddle member from a steel stamping, the stamping being designed to conform to the surface of the cylinder and also being provided with means for attachment to fluid conducting and supporting members, the members being designed so that they can be produced from ordinary round bar stock by automatic screw machine operations.

Other objects and advantages of my invention will become apparent from the following description of a preferred form thereof, reference being made to the accompanying drawing wherein I have illustrated my invention as applied to wheel cylinder assemblies for hydraulic vehicle brakes of a conventional type.

Figure 1:
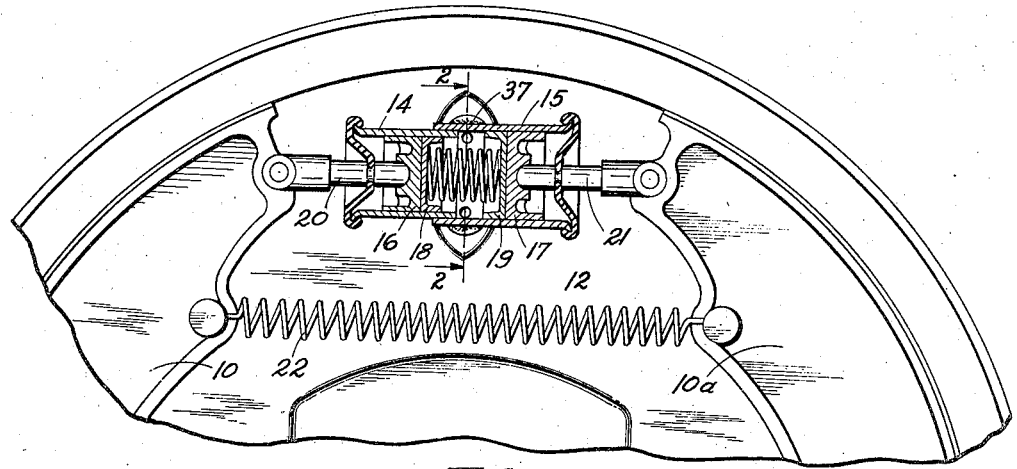
Figure 3:
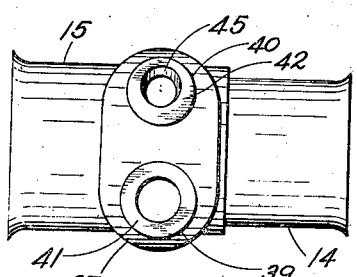
Figure 2:
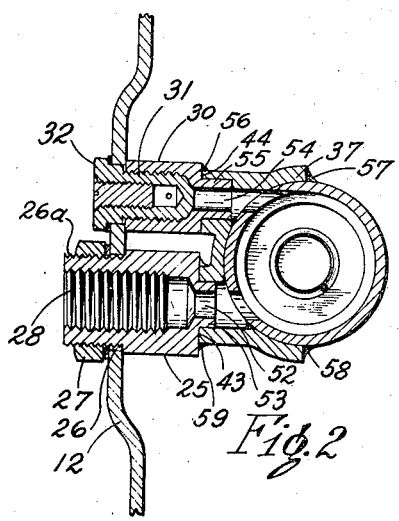
Figure 4:
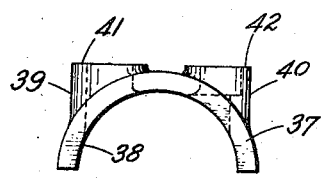

In the drawing, Figure 1 is a fragmentary side elevation of a hydraulic brake of a conventional type embodying my invention, parts of the mechanism being shown in section; Figure 2 is a section taken along the line 2—2 of Figure 1; Figure 3 is a side elevation illustrating the brake cylinder removed from the brake; and Figure 4 illustrates the pressed metal saddle or connection member employed in my assembly.

In Figures 1 and 2 of the drawing, I have illustrated an adaptation of my invention to a brake of a type now in wide use. The brake which is of conventional construction may have brake shoes 10 and 10a pivoted at their lower ends (not shown) which are in turn secured to a backing plate 12 suitable mounted on the wheel axle. The brake shoes may be swung outwardly into engagement with the brake drum by means of fluid pressure within the communicating cylinders 14 and 15 and acting on pistons 16 and 17. The pistons actuate the brake shoes through suitable connecting rods 20 and 21, and to prevent leakage of the fluid, the pistons are provided with the usual rubber cups 18 and 19. Upon release of the fluid pressure the shoes are moved out of engagement with the drum by retractor spring 22. The cylinders 14 and 15 are preferably of different diameters in order to vary the expanding forces exerted on the respective brake shoes for purposes which are well understood by those skilled in the brake art.

As illustrated particularly in Figure 2, the brake cylinders may be supported upon the backing plate 12 by means of the fluid conducting and supporting member 25 which projects through an opening 26 in the backing plate and is secured thereto by any convenient means as by the nut 27. The member 25 is provided with internal screw threads 28 for connection to a suitable fluid pressure hose or other fitting not illustrated herein. I have also provided a vent block 30 having a passageway 31 therein which also extends adjacent the backing plate, the passageway 31 being normally closed by the plug 32 which has the additional function of assisting in preventing the cylinder from rocking with respect to the backing plate.

In order to provide a convenient means of supporting the cylinders and forming a fluid connection between the members 25 and 30 and the cylinders, I preferably employ the pressed metal saddle member indicated generally at 37. The member 37, as illustrated particularly in Figure 4, is of a generally hollow arcuate shape and has an arcuate surface 38 which is adapted to coincide with the outer surface of the larger cylinder 15. To provide means for connection with the members 25 and 30, the pressed metal saddle member 37 is also formed with projecting hollow bosses 39 and 40 for engagement with the members 25 and 30, respectively. The design of the saddle member is such that it can readily be formed by a stamping operation to provide the arcuate surface and the drawn hollow bosses 39 and 40, the hollow bosses being preferably provided with flat circular end surfaces 41 and 42 for engagement with shoulders 43 and 44 on the members 25 and 30, respectively.

Preferably, the boss 40 is provided with an eccentric counterbore as at 45, so that the vent passageway will be substantially tangential to the top of the inner surface of the cylinder 15 throughout the length of the passageway. This is important to prevent the formation of pockets where air might become trapped.

Because of the formation of the pressed metal saddle member, the fluid conducting members 25 and 30 can be formed rapidly and cheaply from steel bar stock by automatic screw machine operations as no specially shaped surfaces are necessary in these members in order to make the required connections. Thus the member 25 can be formed from bar stock by drilling a central passageway through the bar and forming in the passageway the portion 52 of reduced diameter and the threads 28, cutting the external threads 26a thereon, turning the portion 53 to reduced diameter to fit within the projecting hollow boss 39 of the saddle member, and cutting off the machined piece from the bar. The vent member 30 may be similarly formed by drilling and tapping the passageway 31, drilling the portion 54 of the passageway to provide a reduced diameter therein, forming the cylindrical portion 55 of reduced diameter to fit within the projecting hollow boss 40 and to provide the shoulder 44 which engages the end of the projecting boss.

It will thus be seen that all the parts going to make up my cylinder assembly can be rapidly and expeditiously formed. The assembly of the parts to form a strong unitary structure can likewise be carried out expeditiously and inexpensively. I preferably assemble the parts by means of a copper brazing operation which in one operation produces a strong and fluid tight alloy bond between all the contacting surfaces of the respective parts. To carry out the copper brazing operation, the parts are preferably assembled in their proper relationship and supported on a block of refractory material in a suitable manner, for example as described in my prior application referred to above. If necessary, the parts may be held in assembled relationship before the brazing operation by spot welding the stamped saddle to the cylinder 15.

In order to secure the parts permanently together, copper may be supplied to the adjacent contacting surfaces of the parts by methods well known to those skilled in the art of copper brazing, for example by electroplating with copper, by coating the parts with copper powder, or by placing copper pellets or wires adjacent the contacting surfaces of the parts. The parts so assembled and provided with the necessary supply of copper are then placed in a furnace having a controlled atmosphere of hydrogen or other suitable reducing gas and are heated to a temperature of about 2150° F. At this temperature, and in the proper atmosphere, the copper becomes fluid and alloys with the underlying steel surfaces, forming an extremely strong alloy bond between the adjacent contacting steel surfaces. The bond is leak proof throughout substantially the entire area of contact of the respective parts.

If desired, sufficient copper may be supplied to form fillets as at 56, 57, 58 and 59, and also sufficient copper may be supplied to cover all or part of the surfaces of the parts with a corrosion resisting coating of copper and copper-steel alloy.

After the brazing operation is carried out, I may drill through the walls of the cylinder 15 to complete the fluid connections to the cylinder. By carrying out the drilling operation after the assembly has been completed, the preliminary operation of assembly can be done more quickly inasmuch as there is no necessity to register corresponding openings in the various parts. It will be noted that the passageway 31 extends tangentially into the cylinder. This is necessary in order that all air may be vented out of the cylinder, and without a suitable guide the drilling of this tangential passageway is a difficult operation requiring special jigs or fixtures. By my method of assembly, the saddle member and associated vent block 30 function as a guide for properly locating the drill in carrying out this operation. In a similar manner, the fluid conducting and supporting member 25 properly locates the drill for completing the passageway 28 into the interior of the cylinder.

From the foregoing description of a preferred form of my invention as applied to a hydraulic brake cylinder assembly, it will be seen that I have provided a construction whereby fluid connections can be made to cylindrical members having curved or irregular surfaces with a minimum of expense and with a minimum amount of machining being necessary. By my method, the parts going to make up my assembly may be rapidly and inexpensively assembled. According to my invention, it is possible to construct the parts from drawn or stamped sheet metal members and from automatic screw machine products so that the cost of manufacturing the various parts is extremely low. It will also be evident that I have provided an extremely light and strong assembly.

In the foregoing specification, I have described my invention as applied to hydraulic brake cylinder assemblies embodying a pair of telescoped cylindrical members to provide cylinders of different diameters. It will be obvious to those skilled in the art that my invention may be applied to other types of brake cylinders such as cylinders of uniform diameter throughout. It will also be obvious to persons skilled in the art that my invention may be applied to devices other than hydraulic brakes, and in fact may be applied to the solution of many problems involving the formation of a fluid connection with a part having a curved or irregular shape. It is therefore to be understood that my invention is not limited to the preferred embodiment disclosed herein or in any manner other than by the appended claims, when given the range of equivalents to which my patent may be entitled.

I claim:

1. A fluid pressure brake cylinder assembly comprising two oppositely extending open ended cylinders of different diameters formed of sheet stock and telescoped together throughout a portion of their lengths to provide an assembly having internal cylindrical surfaces of different diameters, a pressed metal saddle member having an arcuate surface disposed adjacent the overlapping portions of said cylinders and conforming to an outer wall surface of the larger of said cylinders and having a plurality of projecting fluid conducting portions formed within said arcuate surface, and fluid conducting members mounted on each of said fluid conducting portions, there being fluid passageways extending through said fluid conducting members and said projecting portions and into communication with the interior of said larger cylinder, at least one of said passageways extending tangentially to said larger cylinder, said cylinders, saddle member and fluid conducting members being permanently joined together by an alloy bond to form a fluid-tight assembly.

2. A fluid pressure brake cylinder assembly comprising two oppositely extending open ended cylinders formed of sheet stock and telescoped together throughout a portion of their lengths to provide an assembly having internal cylindrical surfaces of different diameters, a pressed metal saddle member having an arcuate surface disposed adjacent the overlapping portions of said cylinders and conforming to an outer wall surface of one of said cylinders and having a projecting fluid conducting portion formed within said arcuate surface, and a fluid conducting member formed of bar stock and mounted on said fluid conducting portion, said cylinders, saddle member and fluid conducting member being permanently joined together to form a fluid tight assembly.

3. The method of making a fluid pressure brake cylinder assembly which comprises forming a pair of open ended drawn steel cylinders of different diameters, telescoping said cylinders together throughout a portion of their lengths, forming a saddle member of ferrous sheet stock having a surface adapted to conform to an outer wall of one of said cylinders and having a drawn hollow boss projecting from within the boundaries of said surface, forming a fluid conducting member from ferrous bar stock having a passageway therein and having a surface adapted to conform to a surface of said hollow boss, permanently joining said parts by copper brazing to form a fluid tight bond throughout substantially their entire contacting areas, and thereafter forming a passageway through the wall of one of said cylinders in communication with the interior of said hollow boss.

4. The method of making a fluid pressure brake cylinder assembly which comprises forming a drawn steel cylinder having a curved outer wall, forming a saddle member of ferrous sheet stock having a curved surface adapted to conform to said curved outer wall and having a plurality of drawn hollow bosses projecting from within the boundaries of said curved surface, securing the saddle member in position by spot welding, and thereafter permanently joining said parts by an alloy bond to form a fluid tight bond throughout substantially their entire contacting areas, and forming passageways through the wall of said cylinder in communication with the interiors of said hollow bosses.

5. The method of making a fluid connection with a hollow tubular member formed of ferrous material and having a curved outer wall which comprises forming a saddle member of ferrous sheet stock having a curved surface adapted to conform to said curved outer wall and having a drawn hollow boss projecting from within the boundaries of said curved surface, securing the saddle member in position on the curved surface by spot welding, and thereafter permanently joining said parts together by copper brazing to form a fluid tight alloy bond throughout substantially their entire contacting areas, and forming a passageway through the wall of said hollow member in communication with the interior of said hollow boss.

6. A method of making a fluid pressure cylinder assembly which comprises forming a steel cylinder having a curved outer wall, forming a steel saddle member having a curved surface adapted to conform to said curved outer wall, forming communicating passageways through said saddle member and wall of said cylinder, permanently joining said saddle member and said cylinder by copper brazing to form a fluid tight bond throughout substantially their entire contacting areas, said saddle member being spot welded to said cylinder before the brazing operation to hold the saddle member in position during the brazing operation.

7. The method of forming hydraulic cylinders, comprising cutting a cylinder tube to the desired length, separately forming and machining a nipple with an arcuate surface corresponding in radius to the outer surface of said tube, tacking said nipple to said tube, then copper brazing the assembly and aperturing said tube in registration with said nipple.

8. The method of forming hydraulic cylinders comprising cutting a cylinder tube to the desired length, separately forming and machining a nipple with an arcute surface corresponding in radius to the outer surface of said tube, copper brazing the parts to each other and aperturing said tube in registration with said nipple.

9. The method of forming hydraulic cylinders comprising, cutting the tube to the required length, separately forming and machining a pair of nipples having an arcuate surface corresponding in radius to the external surface of said tube, tacking said nipples to said tube, copper brazing to permanently join the assembly and aperturing the tube in registration with said nipples.

10. The method of forming hydraulic cylinders comprising, cutting a cylinder tube to the desired length, separately forming and machining a nipple with an arcuate surface corresponding in radius to the outer surface of said tube, tacking said nipple to said tube, then integrating the same to each other and aperturing said tube in registration with said nipple.

11. The method of forming hydraulic cylinders comprising, cutting a cylinder tube to the desired length, separately forming and machining a nipple with an arcuate surface corresponding in radius to the outer surface of said tube, hydrogen fusing the parts to each other and aperturing said tube in registration with said nipple.

12. The method of forming hydraulic cylinders comprising, cutting the tube to the required length, separately forming and machining a pair of nipples having an arcuate surface corresponding in radius to the external surface of said tube, tacking these parts to each other, hydrogen fusing to complete the integration thereof and aperturing the tube in registration with said nipples.

ALBERT J. WEATHERHEAD, Jr.